ously inorganic chemicals). United States Patent Office
3,819,693
Patented June 25, 1974

3,819,693
9-HYDROXYFLUORENE-2-ALKANOIC ACIDS AND ESTERS THEREOF
Seymour D. Levine, North Brunswick, and Pacifico A. Principe, South River, N.J., assignors to E. R. Squibb & Sons, Inc., New York, N.Y.
No Drawing. Filed June 18, 1971, Ser. No. 154,600
Int. Cl. C07c 69/76
U.S. Cl. 260—520          3 Claims

ABSTRACT OF THE DISCLOSURE

9-Oxygenated fluorene-2-acetic acid derivatives and corresponding 9-halogenated derivatives and methods for preparing these derivatives are provided. These compounds are useful as anti-inflammatory agents. In addition, a method for treating inflammatory conditions by administering these 9-substituted fluorene-2-acetic acid derivatives are provided.

---

This invention relates to new 9-substituted fluorene-2-acetic acid derivatives having the structure

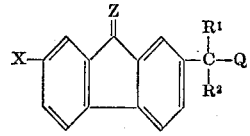

wherein Z is keto (O),

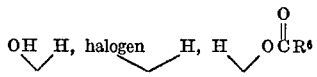

=NOR$^3$, or =NNHR$^3$, wherein R$^3$ is hydrogen, lower alkyl, aryl or substituted aryl, R$^6$ is alkyl, aryl or substituted alkyl or aryl, X is hydrogen, lower alkyl, hydroxyl, lower alkoxy, halogen, amino, trifluoromethyl or nitro, Q is —COOH, —COOR$^4$, —CH$_2$OH or —CN; R$^1$ is hydrogen, lower alkyl or monocyclic cycloalkyl; R$^2$ is hydrogen or lower alkyl or monocyclic cycloalkyl; and R$^4$ is lower alkyl, aryl, aralkyl, or a metallic ion.

Further in accordance with the present invention, a method is provided for treating inflammatory conditions and conditions responsive to treatment with anti-inflammatory agents, which comprises administering an anti-inflammatory amount of the compounds of this invention.

The term "lower alkyl" as employed herein includes both straight and branched chain radicals of up to and including eight carbon atoms, for instance, methyl, ethyl, propyl, isopropyl, butyl, s-butyl, t-butyl, isobutyl, pentyl, hexyl, isohexyl, heptyl, 4,4-dimethylpentyl octyl, 2,2,4-trimethylpentyl and the like. The lower alkyl group can include substituents such as aryl.

The halogen can be F, Br, Cl or I.

The term "lower alkoxy" includes straight and branched chain radicals of the structure RO— wherein R includes any of the above lower alkyl groups.

The "amino" groups may include unsubstituted amino or mono- or di-lower alkyl amino groups, wherein lower alkyl is as defined above, such as amino, methylamino, ethylamino, isopropylamino, heptylamino, dimethylamino, diethylamino, methylethylamino, methylbutylamino, ethyl-i-propylamino, acylamino, wherein the acyl group is derived from hydrocarbon carboxylic acids containing less than twelve carbon atoms, and may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl)pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene)pentenoic acid], and the like.

The term "monocyclic aryl" as employed herein includes monocyclic carbocyclic aryl radicals, for instance, phenyl and substituted phenyl radicals, including lower alkylphenyl, such as tolyl, ethylphenyl, butylphenyl and the like, di(lower alkyl)phenyl (e.g., dimethylphenyl, 3,5-diethylphenyl, and the like), halophenyl (e.g., chlorophenyl, bromophenyl, and 2,4,5-trichlorophenyl) and nitrophenyl.

The term "monocyclic cycloalkyl" includes cyclic radicals containing from 3 to 6 ring members (e.g., cyclopropyl, cyclobutyl, cyclopentyl and cyclohexyl).

Compounds of formula (I) wherein Z is

and Q is —COOH can be prepared by converting a compound of the structure

II 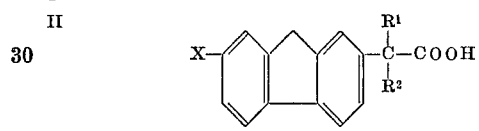

to the corresponding 9-hydroxylated compound by fermentation in the presence of an appropriate microorganism to form a compound of the structure III 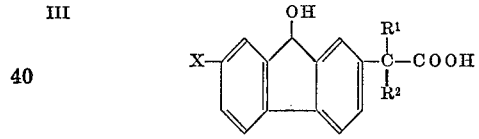

The enzymatic 9-hydroxylation can be accomplished either by including the substrate in a growing or mature culture of an appropriate microorganism, or by treating the substrate with the cells, spores or mycelium or such a culture separated from the growth medium or hydroxylating enzymes separated from cells of such microorganisms.

Suitable microorganisms for hydroxylation include members of the genera: *Glomerella* (e.g., *G. fuseroides*), *Aspergillus* (e.g., *A. niger*), *Syncephalstrum* (e.g., *S. racemonsum*), and *Corticium* (e.g., *C. microsclerotia*).

If the microorganism is used per se, it is grown aerobically in a suitable nutrient medium, as known in the art; the substrate being added either at the beginning or sometime during the culturing process.

In general, the conditions of culturing the microorganisms for the purpose of this invention are the same as those of culutring microorganisms for the production of antibiotics or vitamins. Thus, the microorganism is grown in contact with (in or on) a suitable nutrient medium in the presence of an adequate supply of oxygen (air). A suitable nutrient medium essentially comprises a source of nitrogenous factors and an assimilable source of carbon and energy. The latter may be a carbohydrate, such as sucrose, molasses, glucose, maltose, starch or dextrin. The source of nitrogenous factors may be organic (e.g., soybean meal, corn steep liquor, meat extract, distillers solubles, peptones and/or yeast extract) or synthetic (i.e., composed of simple, synthesizable organic and inorganic compounds such as ammonium salts, alkali nitrates, amino acids or urea).

The acid substrate, in aqueous, aqueous alcoholic solution or dimethylformamide solution, is added either prior to or during the culturing of the microorganism, if the microorganism is used per se, or to an aqueous medium containing the separated cells, spores or cell-free hydroxylating enzyme, if this procedure is employed. After about 1 to about 200 hours, depending on the concentration of this acid and enzyme, the reaction is substantially complete. The resulting 9-hydroxylated derivative can then be recovered by filtration or centrifugation (if solid) or by countercurrent extraction.

The hydroxyl group in the 9-position of compound (III) may be acylated employing conventional techniques, such as by reaction with a carboxylic acid ($R^6COOH$) or acid anhydride or an acyl halide

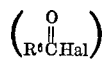

wherein "acyl" is as defined hereinbefore with respect to "acylamino," to form a compound of the structure IV
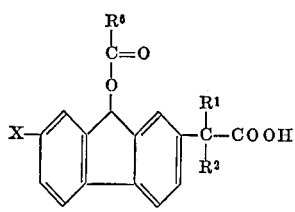

wherein $R^6$ is alkyl or aryl or substituted alkyl or aryl.

Compound (III) can be converted into the corresponding ester (V) by reaction with a diazoalkane or an aryl alcohol in the presence of a mineral acid.

The 9-hydroxylated fluorene-2 acetic acid ester

V
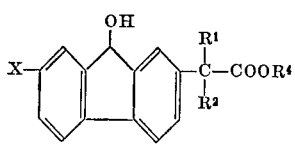

can be converted to the corresponding 9-keto compound (VI) by reaction with an oxidizing agent such as chromium trioxide or manganese dioxide VI
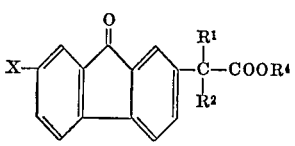

The above 9-keto compound (VI) can be converted to the corresponding acid (VII) by acid or basic hydrolysis.

VII
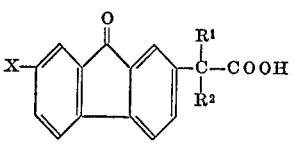

The 9-keto compounds of the invention (VII) can be converted to the corresponding 9-hydroxylated compound (III) by reducing it with sodium borohydride or other reducing agent such as potassium borohydride or lithium borohydride. Compound (VII) can be converted to the corresponding ester (VI) by reaction with a diazoalkane or by treatment with thionyl chloride, followed by treatment with an alkanol or aryl alcohol.

The ester (VI) can then be reduced by reaction with sodium borohydride or other reducing agent to the corresponding 9-hydroxylated ester V.

The 9-hydroxy or 9-keto fluorene-2-acetic acids or esters (III, V, VI or VII) can be reduced, for example, by reaction with lithium aluminum hydride to form an alcohol of the structure VIII
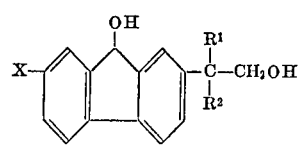

The 9-keto compounds of structure (VII) can also be prepared directly by chemical means by oxidizing an acid of the structure IX
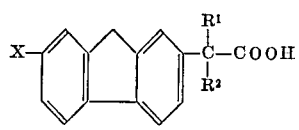

with sodium hypochlorite or chromium trioxide.

The 9-keto compounds of structure (VII) can be converted to the corresponding oximes of the structure X
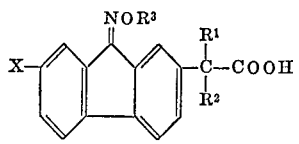

by reacting compound (VII) with a hydroxyl amine of the structure

XI           $H_2NOR_3 \cdot HCl \cdot$

The 9-keto compounds of structure (VII) can be converted to the corresponding hydrazine derivative of the structure XII
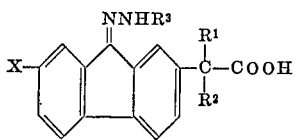

by reacting compound (VII) with a hydrazine of the structure

XIII           $R^3NHNH_2$

9-Halogenated fluorene-2-acetic acid derivatives can be prepared by reacting a 9-hydroxy fluorene-2-acetic acid of structure (III) with a thionyl halide, such as thionyl chloride, followed by treatment with water to form XIV
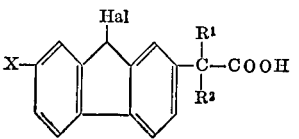

wherein Hal is Cl or Br.

9-Halogenated fluorene-2-acetic acid ester derivatives can be formed by reacting the 9-hydroxy fluorene-2-acetic acid ester (V) with a thionyl halide, such as thionyl chloride, to form XV
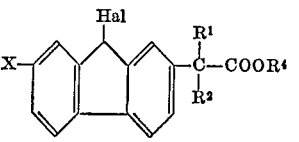

Compound XV can be converted to the corresponding acid (XIV) by acid or base hydrolysis.

The 9-halogenated fluorene-2-acetic acid (XIV) can be reduced to the corresponding primary alcohol XVI by reaction with lithium aluminum hydride.

XVI
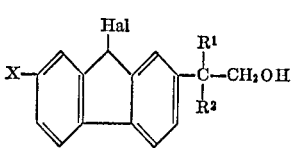

Compounds of formula (I) wherein Q is —CN can be prepared by reacting a 9-ketofluorene-2-acetic acid of the structure (VII) with a thionyl halide, such as thionyl chloride, to form an acyl chloride, converting this to an amide with ammonia, and dehydrating the amide with a dehydrating agent such as phosphorus pentoxide or thionyl chloride to form a compound of the structure

XVII

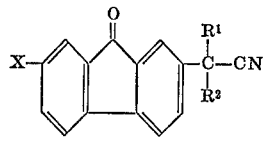

The above 9-ketofluorene-2-acetonitrile can be reduced, for example, by reaction with sodium borohydride to form the corresponding 9-hydroxyfluorene-2-acetonitrile. The 9-hydroxyfluorene-2-acetonitrile can be reacted with a thionyl halide to form the corresponding 9-halo compound. Furthermore, the above 9-ketofluorene-2-acetonitrile can be converted to the corresponding oxime by reaction with a hydroxyl amine of the structure (XI).

Starting compounds of structure (XVIIa)

XVIIa

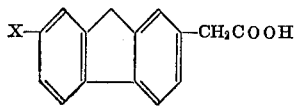

can be prepared by reacting a 7-substituted fluorene-2-glyoxylic acid or ester of structure (XVIII)

XVIII

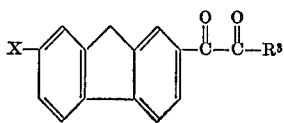

or fluorene-2-glyoxylic acid with hydrazine or hydrazine hydrate in a modified Wolf-Kishner reaction at a temperature within the range of from about 130 to about 180° C. until solution is achieved, cooling the solution to a temperature within the range of from about 50 to about 60° C. and treating the cooled solution with a base such as an alkali metal hydroxide or alkoxide such as potassium hydroxide or sodium ethoxide.

Glyoxylic acids ar esters of structure (XVIII) can be prepared by reacting fluorene or a 7-halogen substituted fluorene with a lower alkyl oxalyl halide having the structure

XIX

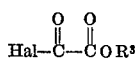

in the presence of a catalyst such as aluminum chloride or other Friedel-Crafts catalyst. The above reaction is carried out in the presence of an inert solvent such as ethylene dichloride, carbon disulfide, carbon tetrachloride, or petroleum ether, at a temperature within the range of from about —5° to about +15° and preferably from about 5° to about 10°. The fluorene compound is employed in a molar ratio to the oxalyl compound of within the range of from about 0.9:1 to about 0.75:1 and preferably from about 0.9:1 to about 0.85:1.

The

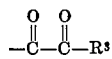

group in formula (XVIII) wherein $R^3$ is alkyl can be converted to the corresponding carboxyl group to form a fluorene-2-glyoxylic acid by basic hydrolysis, that is by reacting a fluorene derivative of structure (XVIII) with a base such as an alkali metal or alkaline earth metal hydroxide or alkoxide, such as sodium hydroxide or sodium methoxide, in the presence of an aqueous alcohol containing up to about five carbon atoms, such as methanol or ethanol. These carboxylic acids can be esterified to form the corresponding esters by conventional methods known in the art.

Compounds of structure (II) wherein Q is —COOH and $R^1$ is lower alkyl or cycloalkyl and $R^2$ is hydrogen can be prepared as follows: esters of compounds of the structure (II) (where Q is $COOR^4$ and $R^1$ and $R^2$ are hydrogen) are alkylated with an alkyl halide or cycloalkyl halide in an inert solvent such as dimethylformamide or diglyme, in the presence of a base such as sodium hydride.

Compounds of the structure (II) and compounds of formula (I) wherein $R^1$ is hydrogen and Q is COOH may also be prepared by reacting the appropriately substituted fluorene-2-carboxylic acid halide with a diazoalkane to form the corresponding diazoketone followed by a Wolff rearrangement to an ester and hydrolysis.

Examples of starting fluorene-2-acetic acids which may be employed herein include, but are not limited to, the following:

TABLE A

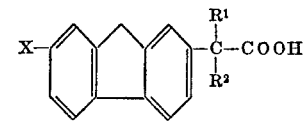

| | X | $R^1$ | $R^2$ |
|---|---|---|---|
| 1 | H | H | H |
| 2 | $C_5H_{11}$ | H | H |
| 3 | $C_2H_5$ | H | H |
| 4 | $NH_2$ | H | H |
| 5 | $CF_3$ | H | H |
| 6 | Cl | H | $CH_3$ |
| 7 | ⟨S⟩ | H | H |
| 8 | $NH_2$ | H | $C_2H_5$ |
| 9 | $NO_2$ | H | $C_3H_7$ |
| 10 | H | ⟨S⟩ | H |
| 11 | H | H | $CH_3$ |
| 12 | $CH_3O-$ | H | H |
| 13 | OH | H | H |

Esters of these compounds, such as the methyl ester, can also be employed as starting materials.

A complete disclosure of starting materials as well as methods for preparing starting materials are set out in application Ser. No. 70,913, filed Sept. 9, 1970, which is incorporated herein by reference.

The 9-substituted-fluorene-2-acetic acid derivatives of the invention form salts with organic bases, e.g., alkylamines such as methylamine, ethylamine, isopropylamine, glucamine, aniline, dimethylamine, etc., heterocyclic amines such as piperidine, morpholine, and the like, and with inorganic bases, e.g., ammonium hydroxide, alkali metal hydroxides such as sodium hydroxide, potassium hydroxide, etc., alkaline earth metal hydroxides such as calcium hydroxide, magnesium hydroxide, etc., alkali metal carbonates and bicarbonates such as sodium carbonate, potassium bicarbonate, etc. These basic salts may be used in the preparation and/or isolation of the products of this invention. When the product is produced in the form of the basic salt, neutralization with an acid, e.g., a mineral acid such as hydrochloric acid, or organic acid such as citric acid, will yield the compound in the acid form. Other basic salts may then be formed by reaction with the appropriate organic or inorganic base.

The compounds of this invention are useful as anti-inflammatory agents and are effective in the prevention and inhibition of granuloma tissue formation in warm blooded animals, for example, in a manner similar to indomethacin. They may be used to decrease joint swelling tenderness, pain and stiffness, in mammalian species, e.g., in conditions such as rheumatoid arthritis. A compound of this invention or a physiologically-acceptable salt of the character described above may be compounded according to accepted pharmaceutical practice in oral dosage forms such as tablets, capsules, elixirs or powders for administration of about 100 mg. to 2 gm. per day, preferably 100 mg. to 1 gm. per day, in two to four divided doses. For example, about 50–150 mg./kg./day is effective in reducing paw swelling in rats.

The compounds of the invention can also be employed as sun-screening agents and as intermediates for reaction with 6-aminopenicillanic acid and 7-aminocephalosporanic acid to produce new useful penicillins and cephalosporins.

The following examples represent preferred embodiments of the present invention.

EXAMPLE 1

9-Hydroxyfluorene-2-acetic acid (A) Fermentation: Surface growth from each of two 2-week old agar slants of *Glomerella fuseroides* (ATCC–9552), the slants containing as nutrient medium (A):

| | Grams |
|---|---|
| Glucose | 10 |
| Yeast extract | 2.5 |
| $K_2HPO_4$ | 1 |
| Agar | 20 |

Distilled water to one liter.

is suspended in 5 ml. of 0.01% aqueous sodium lauryl sulfate solution. One milliliter portions of this suspension are used to inoculate five 250 ml. Erlenmyer flasks, each containing 50 ml. of the following sterilized medium (B):

| | Grams |
|---|---|
| Glucose | 30 |
| Soy bean meal | 20 |
| Soy bean oil | 2.2 |
| $CaCO_3$ | 2.5 |

Distilled water to one liter.

After approximately 24 hours incubation at 25° C. with continuous rotary agitation (280 cycles/minutes; two inch stroke), 10% (vol./vol.) transfers are made to twenty 250 ml. Erlenmyer flasks each containing 50 ml. of the following sterilized medium (C):

| | Grams |
|---|---|
| Cornsteep liquor | 6 |
| $NH_4H_2PO_4$ | 3 |
| Yeast extract | 2.5 |
| Dextrose | 10 |
| $CaCO_3$ | 2.5 |

Distilled water to one liter.

Substrate (300 micrograms/ml.) is then added by supplementing each flask with 0.25 ml. of a sterile solution (60 mg./ml.) of fluorene-2-acetic acid in N,N-dimethylformamide. A total of 300 mg. is fermented.

After approximately three days of further incubation using identical conditions as described above, the contents of the flasks are pooled and the broth is adjusted to pH 3.0 with 12N $H_2SO_4$. The acidified broth is then filtered through a Seitz clarifying pad. The flasks, mycelium and pad are washed with successive 100 ml. portions of warm water. The combined filtrate and washings have a volume of 1300 ml.

(B) Isolation: The thus obtained filtrate is extracted with ethyl acetate (3× 500 ml.). The combined ethyl acetate extracts are washed with water (3× 500 ml.) and evaporated to dryness. The residue is plate chromatographed on silica gel, and the major band extracted with ethyl acetate-methanol (4:1). Evaporation of the solvents gives 9-hydroxyfluorene-2-acetic acid;

$\tau_{TMS}^{DMSO}$ 6.44

(s, 2-$CH_2$) and 4.53 (s, 9-H).

EXAMPLE 2

Methyl 9-hydroxyfluorene-2-acetic acid

A solution of 200 mg. of 9-hydroxyfluorene-2-acetic acid in 3 ml. of methanol is treated with an excess of diazomethane in ether. After one hour at room temperature, acetic acid is added and the solution evaporated to dryness. The residue is crystallized from methanol-isopropyl ether to give 140 mg. of the title compound, m.p. 128–130°. Recrystallization from acetone-isopropyl ether gives the title compound, m.p. 130–131°;

$\tau_{TMS}^{DMSO}$ 6.36

(s, 2-$CH_2$), 6.25 (s, 2-$CH_2CO_2\underline{CH}_3$) and 4.52 (s, 9-H); $[\alpha]_D = -30°$ (95% EtOH).

*Analysis.*—Calcd. for $C_{16}H_{14}O_3$: C, 75.57; H, 5.55. Found: C, 75.45; H, 5.69.

EXAMPLE 3

9-Ketofluorene-2-acetic acid

A solution of 70 mg. of 9-hydroxyfluorene-2-acetic acid in 10 ml. of acetone is treated with an excess of Jones reagent. The mixture is treated with methanol, filtered through Hy-flo and evaporated to give the title compound. The analytical sample is prepared by evaporative distillation at 170°, m.p. 179–181°;

$\tau_{TMS}^{DMSO}$ 6.46

(s, 2-$CH_2$).

*Analysis.*—Calcd. for $C_{15}H_{10}O_3$: C, 75.62; H, 4.23. Found: C, 75.59; H, 4.50.

EXAMPLE 4

9-Hydroxy-α-methylfluorene-2-acetic acid

Following the procedure in Example 1, but utilizing α-methylfluorene-2-acetic acid as the substrate for the fermentation there is obtained the title compound, $\tau_{TMS}^{DMSO}$ 8.64

(d, J=6.5 cps., 2-C—$CH_3$), 6.38 (m, 2-CH) and 4.54 (m, 9-H).

EXAMPLE 5

Methyl 9-hydroxy-α-methylfluorene-2-acetic acid

Following the procedure in Example 2, but substituting 9-hydroxy-α-methylfluorene-2--acetic acid for 9-hydroxyfluorene-2-acetic acid there is obtained from isopropyl ether the title compound, m.p. 130–131°.

*Analysis.*—Calcd. for $C_{17}H_{16}O_3$: C, 76.10; H, 6.01. Found: C, 76.37; H, 6.05.

EXAMPLE 6

9-Keto-α-methylfluorene-2-acetic acid

Following the procedure in Example 3, but substituting 9-hydroxy-α-methylfluorene-2-acetic acid for 9-hydroxyfluorene-2-acetic acid, there is obtained the title compound, $\tau_{TMS}^{CDCl_3}$ 8.49

(d, J=6.5 cps., 2-C—$CH_3$) and 6.26 (q, 2-C—H).

EXAMPLE 7

9-Hydroxy-7-methoxyfluorene-2-acetic acid

Following the procedure in Example 1, but utilizing 400 mg. of 7-methoxyfluorene-2-acetic acid as the substrate, there is obtained from acetone-isopropyl ether 98 mg. of title compound, m.p. 194–195°. The analytical sample is prepared by crystallization from acetonitrile, m.p. 195–196°, $\tau_{TMS}^{DMSO}$ 6.38

(s, 2-$CH_2$), 6.18 (s, 7-$OCH_3$), and 4.55 (m, 9-H).

*Analysis.*—Calcd. for $C_{16}H_{14}O_4$: C, 71.10; H, 5.22. Found: C, 71.30; H, 5.04.

EXAMPLE 8

Methyl 9-hydroxy-7-methoxyfluorene-2-acetic acid

Following the procedure in Example 2, but substituting 9-hydroxy-7-methoxyfluorene-2-acetic acid for 9-hydroxyfluorene-2-acetic acid, there is obtained from chloroform-isopropyl ether the title compound, m.p. 128–129°;

$$[\alpha]_D = +4°$$

(95% EtOH).

Analysis.—Calcd. for $C_{17}H_{16}O_4$: C, 71.82; H, 5.67. Found: C, 71.71; H, 5.84.

EXAMPLE 9

Methyl 9-keto-7-methoxyfluorene-2-acetic acid

A solution of 25 mg. of methyl 9-hydroxy-7-methoxyfluorene-2-acetic acid in 4 ml. of acetone is treated dropwise with a slight excess of Jones reagent. Methanol is added and the suspension filtered. The filtrate is evaporated and the residue crystallized from isopropyl ether to give 14 mg. of the title compound, m.p. 92.5–93.5°. The analytical sample is prepared by recrystallization from isopropyl ether-acetone, m.p. 92.5–93°.

Analysis.—Calcd. for $C_{17}H_{14}O_4$: C, 72.33; H, 5.00. Found: C, 72.37; H, 4.93.

EXAMPLE 10

9-Keto-7-methoxyfluorene-2-acetic acid

A solution of 100 mg. of methyl 9-keto-7-methoxyfluorene-2-acetic acid in 10 ml. of ethanol containing 0.5 ml. of 50% aqueous potassium hydroxide solution is refluxed overnight. The reaction mixture is concentrated, diluted with water, acidified and then extracted with chloroform. The chloroform extracts are washed with 8% salt solution, dried ($Na_2SO_4$) and evaporated to give the title compound.

EXAMPLE 11

9-Ketofluorene-2-acetic acid

A mixture of 100 mg. of fluorene-2-acetic acid and 90 mg. of sodium hydroxide in 15 ml. of 5.25% sodium hypochlorite solution is stirred at room temperature for several days. The mixture is treated with sodium thiosulfate and then made acidic with 2N HCl. The suspension is extracted with chloroform and the extracts washed with 8% salt solution, dried and evaporated. The residue is chromatographed on silica gel using ethyl acetate as the developing solvent. Elution of the major yellow band with ethyl acetate and evaporation gives the title compound.

EXAMPLE 12

Methyl 9-ketofluorene-2-acetic acid

Following the procedure in Example 2, but substituting 9-ketofluorene-2-acetic acid for 9-hydroxyfluorene-2-acetic acid the title compound is obtained.

EXAMPLE 13

Methyl 9-hydroxyfluorene-2-acetic acid

A solution of 150 mg. of methyl 9-ketofluorene-2-acetic acid in 30 ml. of methanol is treated with 100 mg. of sodium borohydride and stirred at room temperature for 15 minutes. Acetic acid is added and the solution concentrated, diluted with water and extracted with chloroform. The chloroform extracts are washed with 8% salt solution, dried and evaporated to give the title compound.

EXAMPLE 14

9-Hydroxyfluorene-2-acetic acid

Following the procedure in Example 13, but substituting 9-ketofluorene-2-acetic acid for its methyl ester, the title compound is obtained.

EXAMPLE 15

9-Hydroxyfluorene-2-ethanol

A solution of 380 mg. of 9-ketofluorene-2-acetic acid in 15 ml. of tetrahydrofuran, is treated with 125 mg. of lithium aluminum hydride and refluxed for three hours. The mixture is treated with ice-water and extracted with chloroform. The chloroform extracts are washed with 8% salt solution, dried and evaporated to give the title compound.

EXAMPLE 16

Methyl 9-chlorofluorene-2-acetic acid

A mixture of 1.1 g. of methyl 9-hydroxyfluorene-2-acetic acid in 4 ml. of thionyl chloride is refluxed for 1.5 hours. Excess thionyl chloride is removed by distillation to afford the title compound.

EXAMPLE 17

9-Chlorofluorene-2-acetic acid

A. A mixture of 600 mg. of methyl 9-chlorofluorene-2-acetic acid in 15 ml. of ethanol containing 100 mg. of sodium hydroxide is refluxed for two hours. The mixture is diluted with water, acidified and extracted with chloroform. The chloroform extracts are washed with 8% salt solution, dried and evaporated to give the title compound.

B. A mixture of 1.0 g. of 9-hydroxyfluorene-2-acetic acid in 5 ml. of thionyl chloride is refluxed for 1.5 hours. Excess thionyl chloride is removed by distillation. The residue is treated with water and warmed on the steam bath for 0.5 hour. The mixture is extracted with chloroform. The extracts are washed with 8% salt solution, dried and evaporated to give the title compound.

EXAMPLE 18

9-Ketofluorene-2-acetic acid oxime

A solution of 1.1 g. of 9-ketofluorene-2-acetic acid in 25 ml. of ethanol is refluxed with 1.0 g. of hydroxylamine hydrochloride and 1.0 g. of sodium acetate for 7 hours. The mixture is poured into water and extracted with ethyl acetate. The ethyl acetate extracts are washed with 8% salt solution, dried and evaporated to give the title compound.

EXAMPLE 19

9-Ketofluorene-2-acetic acid methoxime

A solution of 1.1 g. of 9-ketofluorene-2-acetic acid in 25 ml. of ethanol is refluxed with 1.0 g. of methoxyamine hydrochloride and 1.0 g. of sodium acetate for 7 hours. The mixture is poured into water, and extracted with ethyl acetate. The ethyl acetate extracts are washed with 8% salt solution, dried and evaporated to give the title compound.

EXAMPLE 20

9-Ketofluorene-2-acetic acid phenylhydrazone

A solution of 1.1 g. of 9-ketofluorene-2-acetic acid in 25 ml. of ethanol is refluxed with 1.0 g. of phenylhydrazine and 1.0 g. of sodium acetate for 3 hours. The mixture is poured into water, and extracted with ethyl acetate. The ethyl acetate extracts are washed with 8% salt solution, dried and evaporated to give the title compound.

EXAMPLE 21

9-Ketofluorene-2-acetonitrile

A mixture of 2.0 g. of 9-ketofluorene-2-acetic acid in 20 ml. of thionyl chloride is refluxed for 2 hours. The mixture is evaporated to dryness and the residue dissolved in 25 ml. of acetone. Ammonia is passed into the solution for 5 minutes. The mixture is washed with saturated $NaHCO_3$ solution, 8% salt solution, dried and evaporated. The residue is refluxed in 30 ml. of toluene containing 3.1 g. of phosphorus pentoxide for 8 hours. The mixture is then diluted with water and extracted with chloroform. The chloroform extracts are washed with 8% salt solution, dried and evaporated to give the title compound.

EXAMPLE 22
9-Hydroxy-7-chloro-α-methylfluorene-2-acetic acid

Following the procedure in Example 1, but substituting 7-chloro-α-methylfluorene-2-acetic acid (prepared as described in application Ser. No. 70,913) as the substrate, there is obtained the title compound.

EXAMPLE 23
Methyl 9-hydroxy-7-chloro-α-methylfluorene-2-acetic acid

Following the procedure in Example 2, but substituting 9-hydroxy-7-chloro-α-methylfluorene-2-acetic acid for 9-hydroxyfluorene-2-acetic acid, there is obtained the title compound.

EXAMPLE 24
Methyl 9-keto-7-chloro-α-methylfluorene-2-acetic acid

Following the procedure in Example 9, but substituting methyl 9-hydroxy-7-chloro-α-methylfluorene-2-acetic acid for methyl 9-hydroxy-7-methoxyfluorene-2-acetic acid, there is obtained the title compound.

EXAMPLE 25
9-Keto-7-chloro-α-methylfluorene-2-acetic acid

Following the procedure of Example 10, but substituting methyl 9-keto-7-chloro-α-methylfluorene-2-acetic acid for methyl 9-keto-7-methoxyfluorene-2-acetic acid, there is obtained the title compound.

EXAMPLES 26 TO 31

Following the prodedure of Example 11, but substituting for the fluorene-2-acetic acid the fluorene-2-acetic acids shown in column A of Table I below and which are prepared as described in application Ser. No. 70,913, the products shown in column B are obtained.

TABLE I

| Ex. No. | X | R¹ | R² | X | R¹ | R² |
|---|---|---|---|---|---|---|
| 26 | CF₃ | H | H | | As in Column A | |
| 27 | NO₂ | H | C₂H₅ | | As in Column A | |
| 28 | OCH₃ | H | CH₃ | | As in Column A | |
| 29 | CH₃ | CH₃ | H | | As in Column A | |
| 30 | OC₂H₅ | H |  | | As in Column A | |
| 31 | C₂H₅ | H |  | | As in Column A | |
| 32 | C₃H₇ | H | H | | As in Column A | |

EXAMPLES 33 TO 39

Following the procedure of Example 2, but substituting for the 9-ketofluorene-2-acetic acid, the compounds in column A of Table II below which correspond to the compounds prepared in Examples 26 to 32, the products shown in column B are obtained.

TABLE II

| Ex. No. | X | R¹ | R² | X | R¹ | R² |
|---|---|---|---|---|---|---|
| 33 | CF₃ | H | H | | As in Column A | |
| 34 | NO₂ | H | C₂H₅ | | As in Column A | |
| 35 | OCH₃ | H | CH₃ | | As in Column A | |
| 36 | CH₃ | CH₃ | H | | As in Column A | |
| 37 | OC₂H₅ | H | | | As in Column A | |
| 38 | C₂H₅ | H | | | As in Column A | |
| 39 | C₃H₇ | H | H | | As in Column A | |

EXAMPLES 40 TO 46

Following the procedure of Example 13, but substituting for methyl 9-ketofluorene-2-acetic acid, the compounds in column A of Table III below which correspond to the compounds prepared in Examples 33 to 39, the products shown in column B are obtained.

EXAMPLES 54 TO 60

Following the procedure of Example 16 but substituting the methyl 9-hydroxyfluorene-2-acetic acids prepared in Examples 40 to 46 (and shown in column A of Table V) for methyl 9-hydroxyfluorene-2-acetic acid, the products shown in column B are obtained.

TABLE III

Column A: X—[fluorenone]—C(R$^1$)(R$^2$)—COOCH$_3$

Column B: X—[9-hydroxyfluorene]—C(R$^1$)(R$^2$)—COOCH$_3$ (with OH at 9-position)

| Ex. No. | X | R$^1$ | R$^2$ | X | R$^1$ | R$^2$ |
|---|---|---|---|---|---|---|
| 40 | CF$_3$ | H | H | | As in Column A | |
| 41 | NO$_2$ | H | C$_2$H$_5$ | | As in Column A | |
| 42 | OCH$_3$ | H | CH$_3$ | | As in Column A | |
| 43 | CH$_3$ | CH$_3$ | H | | As in Column A | |
| 44 | OC$_2$H$_5$ | H | (thiophene) | | As in Column A | |
| 45 | C$_2$H$_5$ | H | (thiopyran) | | As in Column A | |
| 46 | C$_3$H$_7$ | H | H | | As in Column A | |

EXAMPLES 47 TO 53

Following the procedure of Example 15, but substituting the 9-ketofluorene-2-acetic acids as prepared in Examples 26 to 32 (shown in column A of Table IV below) for 9-ketofluorene-2-acetic acid, the products shown in column B are obtained.

TABLE IV

Column A: X—[fluorenone]—C(R$^1$)(R$^2$)—COOH

Column B: X—[fluorenone]—C(R$^1$)(R$^2$)—CH$_2$OH

| Ex. No. | X | R$^1$ | R$^2$ | X | R$^1$ | R$^2$ |
|---|---|---|---|---|---|---|
| 47 | CF$_3$ | H | H | | As in Column A | |
| 48 | NO$_2$ | H | C$_2$H$_5$ | | As in Column A | |
| 49 | OCH$_3$ | H | CH$_3$ | | As in Column A | |
| 50 | CH$_3$ | CH$_3$ | H | | As in Column A | |
| 51 | OC$_2$H$_5$ | H | (thiophene) | | As in Column A | |
| 52 | C$_2$H$_5$ | H | (thiopyran) | | As in Column A | |
| 53 | C$_3$H$_7$ | H | H | | As in Column A | |

TABLE V

| | Column A | | | Column B | | |
|---|---|---|---|---|---|---|
| Exp No. | X | R¹ | R² | X | R¹ | R² |
| 54 | CF₃ | H | H | As in Column A | | |
| 55 | NO₂ | H | C₂H₅ | As in Column A | | |
| 56 | OCH₃ | H | CH₃ | As in Column A | | |
| 57 | CH₃ | CH₃ | H | As in Column A | | |
| 58 | OC₂H₅ | H | (thiophene) | As in Column A | | |
| 59 | C₂H₅ | H | (thiophene) | As in Column A | | |
| 60 | C₃H₇ | H | H | As in Column A | | |

It will be apparent to one skilled in the art that the fluorene-2-acetic acids can be converted to corresponding aryl or aralkyl esters or metallic salts employing conventional esterification or salt formation techniques and that the hydroxyl group in the 9-hydroxyfluorene-2-acetic acids of the invention can be acylated by reaction with a carboxylic or acid anhydride or an acyl halide employing conventional acylation techniques.

We claim:

1. A compound of the formula:

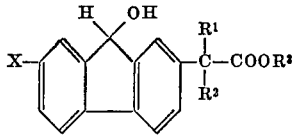

wherein X is selected from the group consisting of hydrogen, lower alkyl and halogen, R¹, R² and R³ are selected from the group consisting of hydrogen and lower alkyl and wherein R³ is hydrogen and the pharmaceutically acceptable salts thereof.

2. A compound as defined in claim 1 having the structure:

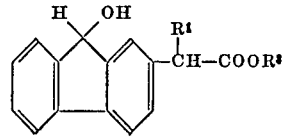

3. A compound of the formula:

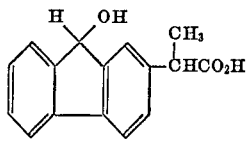

References Cited

UNITED STATES PATENTS 3,639,624  2/1972  Shen et al. _____ 260—520 X

LORRAINE A. WEINBERGER, Primary Examiner

J. F. TERAPANE, Assistant Examiner

U.S. Cl. X.R.

195—30; 260—247.2 R, 293.62, 404, 410.5, 465 R, 465 D, 465 E, 465 G, 469, 471 R, 473 F, 488 CD, 501.1, 501.16, 501.17, 515 A, 518 R, 557 R, 558R, 558 D, 562 B, 562 P, 566 R, 566 A, 566 AE, 613 R, 618 F; 424— 304, 308, 309, 311, 312, 316, 317, 324, 327, 330, 341, 343

UNITED STATES PATENT OFFICE
CERTIFICATE OF CORRECTION

Patent No. 3,819,693  Dated June 25, 1974

Inventor(s) Seymour D. Levine, Pacifico A. Principe

It is certified that error appears in the above-identified patent and that said Letters Patent are hereby corrected as shown below:

Column 1, line 52, "4,4-dimethylpentyl octyl," should read --4,4-dimethylpentyl, octyl,--.

Column 2, line 61, "culutring" should read --culturing--.

Column 4, line 29, "$H_2NOR_3 \cdot HCl$." should read --$H_2NOR^3 \cdot HCl$.--.

Column 7, line 30, "Erlenmyer" should read --Erlenmeyer--.

Column 7, line 43, "Erlenmyer" should read --Erlenmeyer--.

Column 8, line 40, "6.38 (m,2-CH)" should read --6.38 (m,2,-CH)--.

Column 13, Table IV, structure in column A should read as follows:

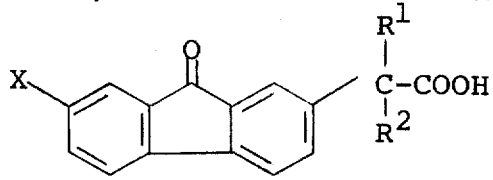

Column 13, Table IV, structure in column B should read as follows:

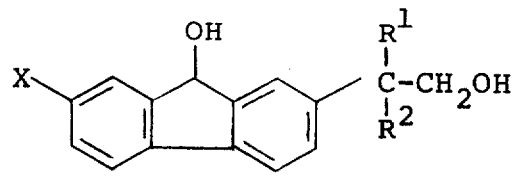

Signed and sealed this 29th day of October 1974.

(SEAL)
Attest:

McCOY M. GIBSON JR.
Attesting Officer

C. MARSHALL DANN
Commissioner of Patents